United States Patent [19]

Yokoya et al.

[11] Patent Number: 4,945,271
[45] Date of Patent: Jul. 31, 1990

[54] SUPPORTING DEVICE FOR GENERATOR ON ENGINE

[75] Inventors: Noboru Yokoya; Hajime Tabata, both of Saitama, Japan

[73] Assignee: Honda Giken Kogyo Kabushiki Kaisha, Tokyo, Japan

[21] Appl. No.: 219,726

[22] Filed: Jul. 7, 1988

[30] Foreign Application Priority Data

Jul. 7, 1987 [JP] Japan .................. 62-104070[U]

[51] Int. Cl.⁵ .................. H02K 5/24; F16D 3/68
[52] U.S. Cl. .................. 310/91; 74/409;
74/440; 310/51; 310/88; 464/73; 464/85
[58] Field of Search .................. 74/409, 440, 606;
310/78, 83, 89, 91, 112, 113, 114, , 51, 88;
464/73, 66, 67, 76, 83, 85; 123/198 R

[56] References Cited

U.S. PATENT DOCUMENTS

| | | | |
|---|---|---|---|
| 3,613,481 | 10/1971 | Lapinski | 74/606 R |
| 3,747,196 | 7/1973 | Whittington | 74/606 R |
| 4,286,187 | 8/1981 | Binder | 310/89 |
| 4,337,406 | 6/1982 | Binder | 310/91 |
| 4,462,482 | 7/1984 | Tsuboi | 123/198 R |
| 4,496,259 | 1/1985 | Foucher | 403/14 |
| 4,540,382 | 9/1985 | Wilson | 464/73 |
| 4,543,075 | 9/1985 | Colford | 464/85 |
| 4,627,885 | 12/1986 | Arlt | 464/85 |
| 4,688,441 | 8/1987 | Yasukawa | 74/409 |
| 4,808,870 | 2/1989 | Gonda | 310/51 |

Primary Examiner—Peter S. Wong
Assistant Examiner—D. L. Rebsch
Attorney, Agent, or Firm—Lyon & Lyon

[57] ABSTRACT

In order to reduce noise attendant with conventional equipment, an electric generator for a vehicle is attached to the vehicle engine by a stay arrangement that places the point of connection between the generator stator and the engine significantly radially outwardly from the stator. The stay apparatus, further, cooperatively mounts a lid plate for sealing the coupling chamber which houses the elastic coupling connected to the generator rotor shaft. A gap provided between the facing surfaces of the lid plate and the coupling chamber is filled by an elastic seal for improving the noise-damping efficiency of the apparatus. The elastic coupler of the generator and drive shafts has alternating radial fins whose interspaces are filled with resilient material.

9 Claims, 1 Drawing Sheet

SUPPORTING DEVICE FOR GENERATOR ON ENGINE

BACKGROUND OF THE INVENTION

This invention relates to a device for supporting a generator on the engine of a motorcycle, and more particularly, to a device for supporting on the body of a motorcycle engine a generator which has a rotor shaft connected by way of an elastic coupling to a generator driving shaft that is connected to the crankshaft of the engine.

Conventionally, when a generator is to be supported on an engine, a bearing bracket secured to an end of the stator of the generator is spigot fitted in an outside wall of the body of the engine (refer, for example, to Japanese Utility Model Publication No. 51-11602). However, in such a generator supporting device, since there exists, at a spigot fitting portion between the bearing bracket and the engine body, a small gap necessary for assembly, when the stator and the rotor are vibrated due to variations in magnetic force during operation of the generator, vibration sound may be produced at the spigot fitting portion due to metallic contact between the elements.

SUMMARY OF THE INVENTION

The present invention has been made in view of such circumstances as described above, and it is, accordingly, an object of the invention to provide a generator supporting device on an engine which will not produce vibration sounds.

In order to attain the object, according to the present invention, a device for supporting on an engine a generator which has a rotor shaft connected by way of an elastic coupling to a generator driving shaft connected to the engine crankshaft is characterized in that an end portion of a stay connecting to the stator of the generator is constructed so as to project radially outwardly from the generator housing to be remote from the stator and is fastened to the body of the engine by means of a bolt.

With the construction so-described, since the stay connecting the stator is securely mounted on the engine body at a location spaced a distance radially outwardly from the stator, vibrations of the stator can be effectively restricted by the engine body. Meanwhile, vibrations produced at the rotor are absorbed by the elastic members coupling between the rotor shaft and the generator driving shaft.

For a better understanding of the invention, its operating advantages and the specific objectives obtained by its use, reference should be made to the accompanying drawings and description which relate to a preferred embodiment thereof.

DESCRIPTION OF A PREFERRED EMBODIMENT

Figure 1:
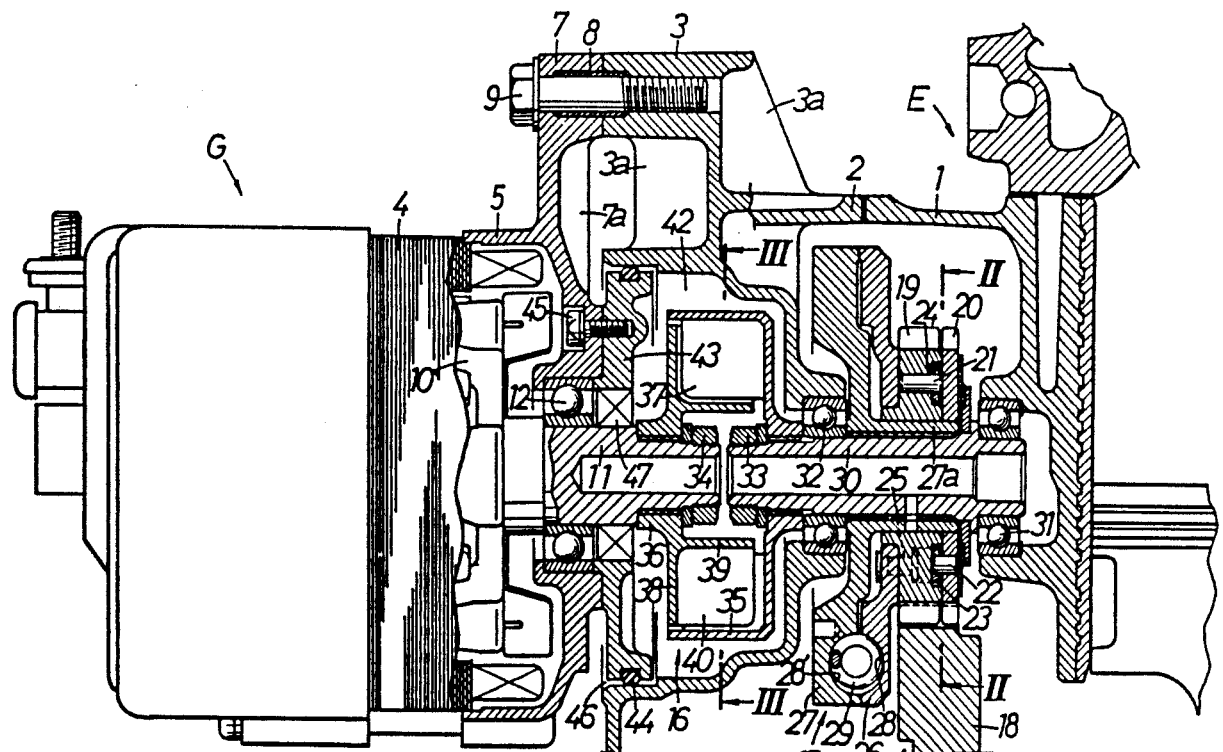
FIG. 1 is an elevational sectional view of a generator supported on the of a motorcycle in accordance with the present invention.

Referring to FIG. 1, reference symbol E denotes an engine for a motorcycle. A side case 2 is connected to the side end of the cylinder block 1 of the motorcycle E. These elements constitute an engine body.

A plurality of supporting arms 3 (only one of which is shown in FIG. 1) that are reinforced by ribs 3a, are formed in an integral relationship on the side case 2, such that they extend radially outwardly from an outer peripheral face of the side case 2. A permanent-magnet alternating current generator G is mounted on the supporting arms 3.

In particular, in the generator G, a bearing bracket 5 fitted on the end of the stator 4 has a plurality of stays 7 (only one of which is shown in FIG. 1) formed in an integral relationship thereon and corresponding to the supporting arms 3 such that they extend in radial directions from an outer peripheral face of the bearing bracket 5. End portions of the stays 7 and the supporting arms 3 contact each other by means of positioning collars 8 interposed between opposing faces thereof and are mutually fastened by means of bolts 9 extending through the positioning collars.

A rotor shaft 11 securely mounted on a rotor 10 of the generator G is supported on the bearing bracket 5 by means of a bearing 12 and has an end thereof projected toward the side of the side case 2. In order to drive the rotor shaft 11, a speed increasing gear train 14, a torque damper 15 and an elastic coupling 16 are interposed in series between the shaft 11 and the crankshaft 13 of the engine E.

The speed increasing gear train 14 is composed of a driving gear 18 of relatively large diameter securely mounted on the crankshaft 13 by means of a bolt 17, and a driven gear 19 supported for rotation on the hub 27a of a driven plate 27, which will be hereinafter described, and held in meshing engagement with the driving gear 18.

Figure 2:
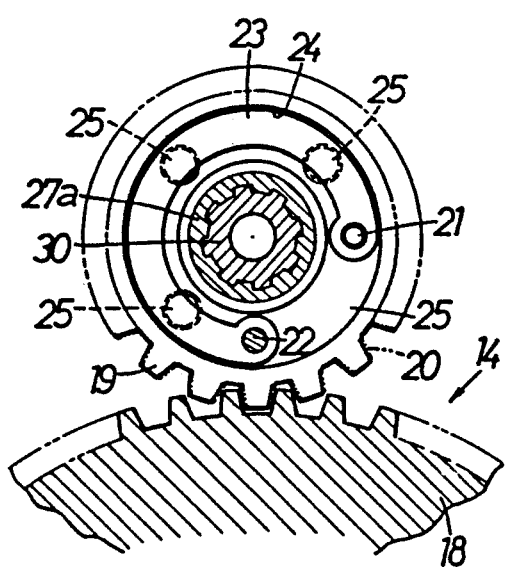
FIG. 2 is a sectional view taken along line II—II of FIG. 1.

Referring to FIGS. 1 and 2, in order to eliminate backlash between the gears 18 and 19, an auxiliary gear 20 supported on the hub 27a for rotation relative to the driven gear 19 is held in meshing engagement with the driving gear 18, and a segmental ring spring 23 is connected at the opposite ends thereof to a pair of pins 21 and 22 secured to opposing faces of the driven gear 19 and the auxiliary gear 20. An annular recess 24 for accommodating the ring spring 23 is formed in the opposing face of the driven gear 19.

The ring spring 23 undergoes a suitable degree of expansion or contraction deformation when the driven gear 19 and the auxiliary gear 20 are meshed with the driving gear 18 and, due to a reactive force, the teeth of the driven and auxiliary gears 19 and 20 cooperate to resiliently clamp the teeth of the driving gear 18 therebetween. Backlash between the driving gear 18 and the auxiliary gear 19 is eliminated in this manner.

Referring back to FIG. 1, the torque damper 15 is composed of a driving plate 26 coupled to the driven gear 19 by means of a rivet 25, a driven plate 27 disposed in opposing relationship and for relative rotation to the driving plate 26, and a plurality of damping members 29 in the form of coil springs accommodated in a plurality of pairs of recesses 28 and 28' (only one pair of which being shown in FIG. 1) formed in an opposing relationship on opposing faces of the driving plate 26 and the driven plate 27. By means of this arrangement, if a torque greater than a predetermined value is applied between the driving plate 26 and the driven plate 27, the damping members 29 will be resiliently deformed so as to damp the torque.

The driven plate 27 has a hub 27a which is spline-coupled to a generator driving shaft 30 disposed in opposing coaxial relation with the rotor shaft 11. The driven gear 19 and the auxiliary gear 20 are supported for rotation on an outer peripheral face of the hub 27a. The generator driving shaft 30 is supported at the opposite end portions thereof for rotation on the cylinder block 1 and the side case 2 by means of a pair of bearings 31 and 32.

Figure 3:
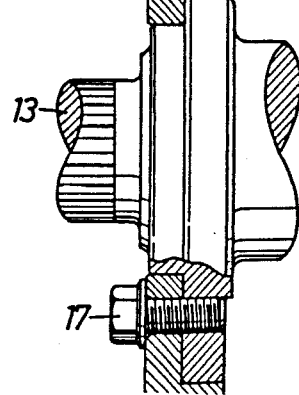
FIG. 3 a sectional view taken along line III—III of FIG. 1.

Referring to FIGS. 1 and 3, the elastic coupling 16 includes an outer member 35 and an inner member 36 which are securely mounted on opposing ends of the generator driving shaft 30 and the rotor shaft 11 by means of a pair of nuts 33 and 34, respectively. The outer member 35 has a tubular configuration having an open axial end. A plurality of driving fins 37 are formed integrally on the inner end wall and the interior peripheral wall of the outer member 35. These fins extend radially inwardly in an equidistantly spaced relationship in the circumferential direction of the outer member 35. The inner member 36 has an end plate portion 38 disposed in such manner as to close the open axial end of the outer member 35, and a cylindrical portion 39 surrounded by the driving fins 37. The end plate portion 38 and the cylindrical portion 39 cooperate to mount a plurality of driven fins 40 integrally formed thereon and extending radially outwardly such that they can be arranged in an alternating relationship with the driving fins 37. A sectorshaped elastic member 41 made of rubber, or like material, is interposed between each of the adjacent driving and driven fins 37 and 40. The elastic members 41 are compressed and deformed by the relative movement that may occur between the driving fins 37 and driven fins 40 when the outer member 35 and the inner member 36 are rotated relative to each other.

A coupling chamber 42 for accommodating the elastic coupling 16 therein is formed in the side case 2. The coupling chamber 42 is opened toward the generator G, and a lid plate 43 is fitted in an inner peripheral face at the open end of the coupling chamber 42 with a seal member 44 interposed therebetween in order to maintain the coupling chamber 42 air-tight and water-tight.

The lid plate 43 is securely mounted on the bearing bracket 5 of the generator G by means of bolt 45. As shown, an annular gap 46, sufficient to prevent the outer peripheral face of the lid plate 43 and the inner peripheral face of the coupling chamber 42 from contacting each other directly even if they are moved relative to each other due to vibrations thereof, is provided between the outer circumferential face of the lid plate 43 and the inner circumferential face of the coupling chamber 42. Meanwhile, an oil seal 47 is mounted on the inner periphery of the lid plate 43 and held in contact with the outer peripheral face of the rotor shaft 11.

The operation of the described embodiment is as follows. If the crankshaft 13 of the engine E rotates, the turning torque thereof is transmitted to the rotor shaft 11 successively via the speed increasing gear train 14, torque damper 15, generator driving shaft 30 and elastic coupling 16. Consequently, the rotor 10 of the generator G is driven to rotate so that the generator G generates electrical energy.

During such driving of the generator G, variations in the torque of the crankshaft 13 and variations in the load of the rotor shaft 11 are absorbed by the torque damper 15 and the elastic coupling 16. Accordingly, the rotor shaft 11 can be driven smoothly from the crankshaft 13.

Further, while the stator 4 and the rotor 10 of the generator G produce vibrations due to variations of magnetic force during generation of electrical energy by the generator G, since the end portions of the stays 7, that extend from the outer peripheral face of the bearing bracket 5 on which the stator 4 is supported, are securely mounted on the supporting arms 3 of a highly rigid member, vibrations of the stator 4 can be effectively restricted due to the fact that first, the securely mounted portions are spaced radially outwardly a significant distance from the engine body by means of the stay, that production of vibration noises from the structure employed for supporting the generator is, accordingly, prevented. Additionally, vibrations of the rotor are absorbed by the elastic coupling, and, consequently, the generator can always operate quietly.

It should be understood that, although a preferred embodiment of the invention has been illustrated and described herein, changes and modifications can be made in the described arrangement without departing from the scope of the appended claims.

We claim:

1. The combination comprising:
   an engine having an engine body including a side casing and a crankshaft operable in said engine body;
   a generator including a stator and a rotatably mounted rotor having a rotor shaft concentrically disposed within said stator;
   means for mounting said generator to said side casing of said engine body; and
   means for operatively connecting said rotor to said crankshaft including:
   a generator drive shaft rotatably driven by said crankshaft;
   an elastic coupling including an inner member attached to said rotor shaft and an outer member attached to said generator drive shaft, said inner and outer members each having radially extending fins in spaced, alternating relation with respect to one another, and a plurality of separate elastic members disposed between adjacent fins to be compressed or extended in response to relative rotation between said generator drive shaft and said rotor shaft;
   a coupling chamber integrally formed on said engine body side casing concentrically enclosing said elastic coupling; and
   means for sealing said coupling chamber from the interior of said generator.

2. The combination according to claim 1 in which said bearing bracket is formed to attach said stator at an axial end thereof, and said stays extend radially outwardly therefrom for connection to said engine body.

3. The combination according to claim 2 in which said connecting means includes a plurality of supporting arms corresponding to said plurality of stays, and said stay securing means comprises means for connecting each said stay to each said supporting arm.

4. The combination according to claim 3 in which said connecting means includes oppositely facing bores in said stays and said supporting arms, positioning collars in said bores, and a threaded connector concentric with said collars for connecting each said stay to each said support arm.

5. The combination according to claim 3 including support means for rigidifying each said supporting arm.

6. The combination according to claim 5 in which said support means include structural ribs extending between said support arms and said engine body.

7. The combination according to claim 1 in which said generator mounting means comprises a generally cylindrical bearing bracket concentrically disposed about said rotor shaft and having means thereon for securing said stator, a plurality of radially outwardly extending stays integrally connected to said bearing bracket and extending outwardly from said stator, and means for securing said stays at the radially outer ends thereof to said engine side casing.

8. The combination according to claim 1 in which said seal means includes a lid plate positioned between said coupling chamber and said generator interior and an elastic seal interposed between the circumferential periphery of said lid plate and that of said coupling chamber.

9. The combination according to claim 8 in which said coupling chamber comprises a generally cylindrical wall having an opening at one end concentrically spaced from, and enclosing, said coupling, said lid plate being concentrically disposed within said opening in spaced relation thereto to define an annular gap therebetween, and said elastic seal being an annular member interposed within said gap.

* * * * *

UNITED STATES PATENT AND TRADEMARK OFFICE
CERTIFICATE OF CORRECTION

PATENT NO. : 4,945,271
DATED : July 31, 1990
INVENTOR(S) : N. Yokoya et al.

It is certified that error appears in the above-identified patent and that said Letters Patent is hereby corrected as shown below:

In claim 2 (column 4, line 54) delete "1" and insert therefor -- 7 --.

In claim 3 (column 4, line 59) delete "connecting means" and insert therefor -- engine body --.

Signed and Sealed this

Fifth Day of May, 1992

Attest:

DOUGLAS B. COMER

Attesting Officer

Acting Commissioner of Patents and Trademarks